United States Patent [19]
Yoshino et al.

[11] Patent Number: 5,419,948
[45] Date of Patent: May 30, 1995

[54] HARD AUSTENITIC STAINLESS STEEL SCREW AND A METHOD FOR MANUFACTURING THE SAME

[75] Inventors: Akira Yoshino, Osaka; Masaaki Tahara, Takatsuki; Haruo Senbokuya, Tondabayashi; Kenzo Kitano, Kawachinagano; Teruo Minato, Hashimoto, all of Japan

[73] Assignee: Daidousanso Co., Ltd., Osaka, Japan

[21] Appl. No.: 83,271

[22] Filed: Jun. 29, 1993

Related U.S. Application Data

[63] Continuation of Ser. No. 669,440, Mar. 13, 1991, which is a continuation-in-part of Ser. No. 479,013, Feb. 12, 1990, Pat. No. 5,013,371.

[30] Foreign Application Priority Data

Oct. 4, 1990 [JP] Japan ................................ 2-267729

[51] Int. Cl.$^6$ ............................................. F16B 25/00
[52] U.S. Cl. ...................... 428/216; 411/411; 428/469; 428/472; 428/698
[58] Field of Search ............... 428/469, 216, 472, 698; 411/411

[56] References Cited

U.S. PATENT DOCUMENTS

4,184,899  1/1980  Blas et al. ..................... 148/15.5

FOREIGN PATENT DOCUMENTS

62-40319  3/1987  Japan.
2006833   5/1979  United Kingdom.

*Primary Examiner*—Archene Turner
*Attorney, Agent, or Firm*—Armstrong, Westerman, Hattori, McLeland & Naughton

[57] ABSTRACT

This invention allows the surface of an austenitic stainless steel screw surface to be formed into a hard nitrided layer so as to harden and a part such as a screw head which is in contact with outside air is removed its own ultra hard surface layer in the hard nitrided layer by scouring or the like to be rust preventive. Even if the ultra hard surface layer is thus removed, an inner hard layer in the hard nitrided layer is present beneath the surface layer to be able to maintain a hard state of the screw surface. In the method for manufacturing the austenitic stainless steel screw according to the invention, upon forming said hard nitrided layer on the screw surface by nitriding, the austenitic stainless steel screw surface is cleaned with a fluorine- or fluoride-containing gas prior to nitriding. Thereby remained foreign matter, oxidized layer and the like on the screw surface are removed and at the same time the screw surface is activated and so N atoms easily penetrate and diffuse when nitriding to form a uniform nitrided layer.

4 Claims, 3 Drawing Sheets

HARD AUSTENITIC STAINLESS STEEL SCREW AND A METHOD FOR MANUFACTURING THE SAME

This is a continuation application of Ser. No. 07/669,440, filed Mar. 13, 1991, which in turn is a continuation-in-part of Ser. No. 479,013, filed Feb. 12, 1990, now U.S. Pat. No. 5,013,371.

TECHNICAL FIELD

This invention relates to a hard austenitic stainless steel screw which is excellent in corrosion resistance and a method for manufacturing the same

PRIOR ART

Generally an austenitic stainless steel is higher in corrosion resistance against acid or salt compared with a carbon steel. However, in surface hardness and strength, it is inferior to the carbon steel. Therefore, it is not proper to use this stainless steel for a screw which needs a function to tighten to an iron-based plate by self-tapping, such as a tapping screw, a self-drilling screw and a dry wall screw. For this purpose, plated carburized iron articles or 13 Cr stainless steel articles are used. It is pointed out as some drawbacks that these articles are not only inferior in oxidation resistance (rust resistance) to the austenitic stainless steel articles but also weak in their tightening function due to corrosion of their base material by acid rain which is one of the big environtmental problems in these days. In this aspect, the austenitic stainless steel articles are far excellent in acid resistance. Accordingly the inventors provided a technology for maintaining tapping property as well as iron articles by nitriding-hardening the austenitic stainless steel (Japanese Patent Application No. 177660/1989). According to the technology, a hard layer by which an iron plate having enough thickness is drilled and tapped self-forcedly can be formed around the periphery of the stainless steel screw. Although the most surface hard layer (15~30 $\mu$m) in thus obtained hardened layer is ultra-hard, it has not necessarily enough corrosion resistance in regard to rust and acid resistance to cause rust easily. According to the inventors' research, it was found that a part which is inner than the ultra-hard surface layer had the same corrosion resistance as the stainless steel base material and did not cause a problem resulted from acid rain like iron articles and 13Cr articles. In the aspect of appearance, it is not preferable to change color of a visible part, especially a screw head seen after tightening. To solve these problems, it was proposed to apply some methods such as a method for nitriding by masking the screw head with copper-plating and a method wherein a screw head part of an austenitic stainless steel is joined with a drill part made of iron carburized material by welding. However, there are disadvantages that masking partly by copper-plating is troublesome to be costly in the former method and plural materials be used to be costly in the latter method. It is possible to plate with Ni-Zn, Zn or Ni wholely in order to prevent rust resulted from ultra hard film layer of the nitrided surface. Since most of platings are weak to sulphuric acid, possibility of generating rust by acid rain can not be excluded, especially for screws used outside. Therefore, plating itself is effective in respect of smoothness and maintaining beautiful appearance, but is not perfect in rust prevention.

OBJECT OF THE INVENTION accordingly, it is the object of the invention to provide a hard austenitic stainless steel screw which has the same drilling, tapping and tightening properties against a steel plate to be drilled as iron articles and its head which is visible after tightening has anti-corrosion property as well as austenitic base material, and a method for manufacturing the same.

DISCLOSURE OF THE INVENTION

To accomplish the above-mentioned purpose, the invention provides a hard austenitic stainless steel screw, as a first gist, characterized in that a hard nitrided layer comprising an ultra hard surface layer and an inner hard layer beneath connecting to a core part of the screw is formed on the surface of an austenitic stainless steel screw, a predetermined part of said hard nitrided layer being removed its ultra hard surface layer to be only the inner hard layer connecting to the core part, and as a second gist, a method for manufacturing a hard austenitic stainless steel screw comprising steps of holding austenitic stainless steel screw base material in a fluorine- or fluoride-containing gas atmosphere to form a fluorinated layer on the surface, heating the fluorinated screw in a nitriding atmosphere to form the screw surface layer into a hard nitrided layer comprising an ultra hard surface layer and an inner hard layer beneath connecting to a core part of the screw and removing said ultra hard surface layer of a predetermined part of said hard nitrided layer to expose the inner hard layer connecting to the core part.

Said inner hard layer means a metal composition layer which is larger than the core part of the stainless steel base material by about 20% in hardness.

During the process of accumulated research for finding out a cause of generating rust on a nitrided layer of an austenitic stainless steel screw, the inventors found out that said nitrided layer had two layers, an ultra hard surface layer and an inner hard layer beneath, that the ultra hard surface layer comprises intermetal compounds such as CrN, $Cr_2N$ and $Fe_{2-3}$ in metal composition, that the inner hard layer is a solid solution in which N, C, Fe-C are solid soluble with austenite of the core part. As mentioned before, they had an idea that if the ultra hard surface layer is eliminated to expose the inner hard layer beneath the ultra hard surface layer, it is possible to prevent rust without losing substantially most of the surface hardness and strength since rust generates only on said ultra hard surface layer, and reached the invention.

The invention is described in detail as follows.

This invention allows to expose the inner hard layer beneath connected to a core part by removing an ultra hard surface layer out of nitrided layer formed on the surface of an austenitic stainless steel screw. In general, the ultra hard surface layer has a thickness of 15 to 30 $\mu$m and a surface hardness (Hv) is 1200 to 1400, and the inner hard layer has a thickness of 30 to 150 $\mu$m and a surface hardness (Hv) is 320 to 650. The inner hard layer is far larger in its surface hardness and almost similar in anti-corrosion property against acid and base compared with the austenitic stainless steel which is base material.

In this invention, a screw is made of austenitic stainless steel base material. After nitriding it as mentioned above, only a surface layer (ultra hard surface layer) in the nitrided layer is removed. The way of removing it is conducted chemically or mechanically. In the chemical way the ultra hard surface layer of a predetermined part, for example, a screw head is dipped in strong acid such as HF-HNO₃, or aqua regia for 10 to 120 minutes. In the mechanical removing way, said part is given a mechanical scouring or the like. In the aspect of removing uniformly, the chemical method is preferable. In addition to the screw head part, it is preferable to remove the ultra hard surface layer of the axis part depending on a screw within the range that the removal does not influence tightening function.

Describing in detail, a hard austinitic stainless steel screw according to the present invention is manufactured as below-mentioned. That is, austenitic stainless steel base material (hereinafter called steel material) is held preliminarily in an atmosphere containing fluorine- or fluoride-containing gas to form a fluorinated layer on the steel surface, then heated in an atmosphere of nitriding to remove said fluorinated layer and at the same time, to form the removed surface (surface layer of the steel material) into a nitrided layer. In ultra hard surface layer in the formed nitrided layer is removed to prevent generating rust.

The term "fluorine- or fluoride-containing gas" as used in the above-mentioned pretreatment prior to nitriding means a dilution of at least one fluorine source component selected from among NF₃, BF₃, CF₄, HF, SF₆ and F₂ contained in an inert gas such as N₂. Among these fluorine source components, NF₃ is most suitable for practical use since it is superior in reactivity, ease of handling and other aspects to the other. As mentined previously, in the present invention steel works are held in the above-mentioned fluorine- or fluoride-containing gas atmosphere at a temperature of, for exmaple, 250° to 400° C. in the case of NF₂, for a preliminary treatament of the steel surface and then subjected to nitriding (or carbonitriding) using a known nitriding gas such as ammonia. When F₂ gas alone or a mixed gas composed of F₂ gas and an inert gas, for example, is used as the fluorine- or fluoride-containing gas in a special case, the above-mentioned holding temperature is arranged in the range of 100° C. to 250° C. The concentration of the fluorine source component, such as NF₃, in such fluorine- or fluoride-containing gas should amount to, for exmaple, 1,000–100,000 ppm, preferabaly 20,000–70,000 ppm, more prefereably 30,000–50,000 ppm. The holding time in such fluorine- or fluoride-containing gas atmosphere may appropriately be selected depending on the steel species, geometry and dimensions of the works, heating temperature and so forth, generally within the range of ten and odd minutes to scores of minutes.

To be more concrete in illustrating the afore-mentioned pretreatment and nitriding using fluorine- or fluoride-containing gas, austenitic stainless steel screws, for instance, are cleaned for degreasing and then charged into a heat treatment furnace 1 such as shown in FIG. 1. This furnace 1 is a pit furnace comprising an inner vessel 4 surrounded by a heater 3 disposed within an outer shell 2, with a gas inlet pipe 5 and an exhaust pipe 6 being inserted therein. Gas supply is made from cylinders 15 and 16 via flow meters 17, a valve 18 and so on and via the gas inlet pipe 5.

The inside atmosphere is stirred by means of a fan 8 driven by a motor 7. Works 10 placed in a metal container 11 are charged into the furnace. In FIG. 1, the reference numeral 13 indicates a vacuum pump and 14 a noxious substance eliminator. A fluorine- or fluoride-containing reaction gas, for example, a mixed gas composed of NF₃ and N₂, is introduced into this furnace and heated, together with the works, at a specified reaction temperature. At temperature of 250°–400° C., NF₃ evolves fluorine in the nascent state, whereby the organic and inorganic contaminants on the steel work surface are eliminated therefrom and at the same time this fluorine rapidly reacts with the base elements Fe and chromium on the surface and/or with oxides occurring on the steel work surface, such as FeO, Fe₃O₂ and Cr₂O₃. As a result, a very thin fluorinated layer containing such compounds as FeF₂, FeF₃, CrF₂ and CrF₄ in the metal composition is formed on the surface, for example as follows:

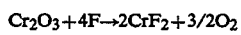

These reactions convert the oxidized layer on the work surface to a fluorinated layer. At the same time, O₂ adsorbed on the surface is removed therefrom. Where O₂, H₂ and H₂O are absent, such fluorinated layer is stable at temperature up to 600° C. and can presumably prevent oxidized layer formation on the metal bases and adsorptin of O₂ thereon until the subsequent step of nitriding. A fluorinated layer, which is similarly stable, is formed on the furnace material surface as well and minimizes the damage to the furnace material surface.

The works thus treated with such fluorine- or fluoride-containing reaction gas are then heated at a nitriding temperature of 480° C.–700° C. Upon addtion of NH₃ or a mixed gas composed of NH₃ and a carbon source gas (e.g. RX gas) in said heated condition, the fluorinated layer supposedly undergoes reduction or destruction by means of H₂ or a trace amount of water to give an active metal base, as shown, for example, by the following reaction equations:

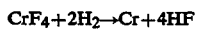

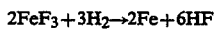

Upon formation of such active metal base, active N atoms are adsorbed thereon, then enter the metal structure and diffuse therein and, as a result, a layer (nitrided layer) containing such nitrides as CrN, Fe₂N, Fe₃N and Fe₄N is formed on the surface.

Thus obtained nitrided layer is formed comprising an ultra hard surface layer 20 and an inner hard layer 21 beneath as shown in FIG. 2. A reference numeral 22 refers to an austenitic stainless steel base material (a core part). In this invention, the ultra hard surface layer 20 of the screw head is removed to expose the inner hard layer 21 on the surface of the screw as shown in FIG. 3. The removal is, for example, conducted by heating HNO₃-HF solution at about 50° C., dipping a predetermined part, for example, a screw head of said stainless steel screw therein for about 10 to 120 minutes to melt and remove the ultra hard surface layer and to expose the inner hard layer beneath the ultra hard surface layer. As mentioned before, the super hard surface layer has a thickness of 15 to 30 μm. For removal of the layer, it is preferable to dip it in a concentrated solution such as aforementioned acid. In some cases, removal may be conducted by scouring with a scourer or the like. The ultra hard surface layer is removed in this way to make the inner hard layer beneath appear. The inner layer has 30 to 150 μm in thickness and is inferior to the ultra hard surface layer, but far superior to stainless steel base material, in surface hardness and strength. Its corrosion resistance is excellent as well as austenitic stainless steel material. Therefore, rust does not generate by acid rain or the like.

That is, the austenitic stainless screw obtained by the above-mentioned method has the same properties as iron articles in tapping and tightening functions, and large corrosion resistance is given against acid and salt.

Followings are descriptions of embodiments.

EXAMPLE 1

Figure 1:
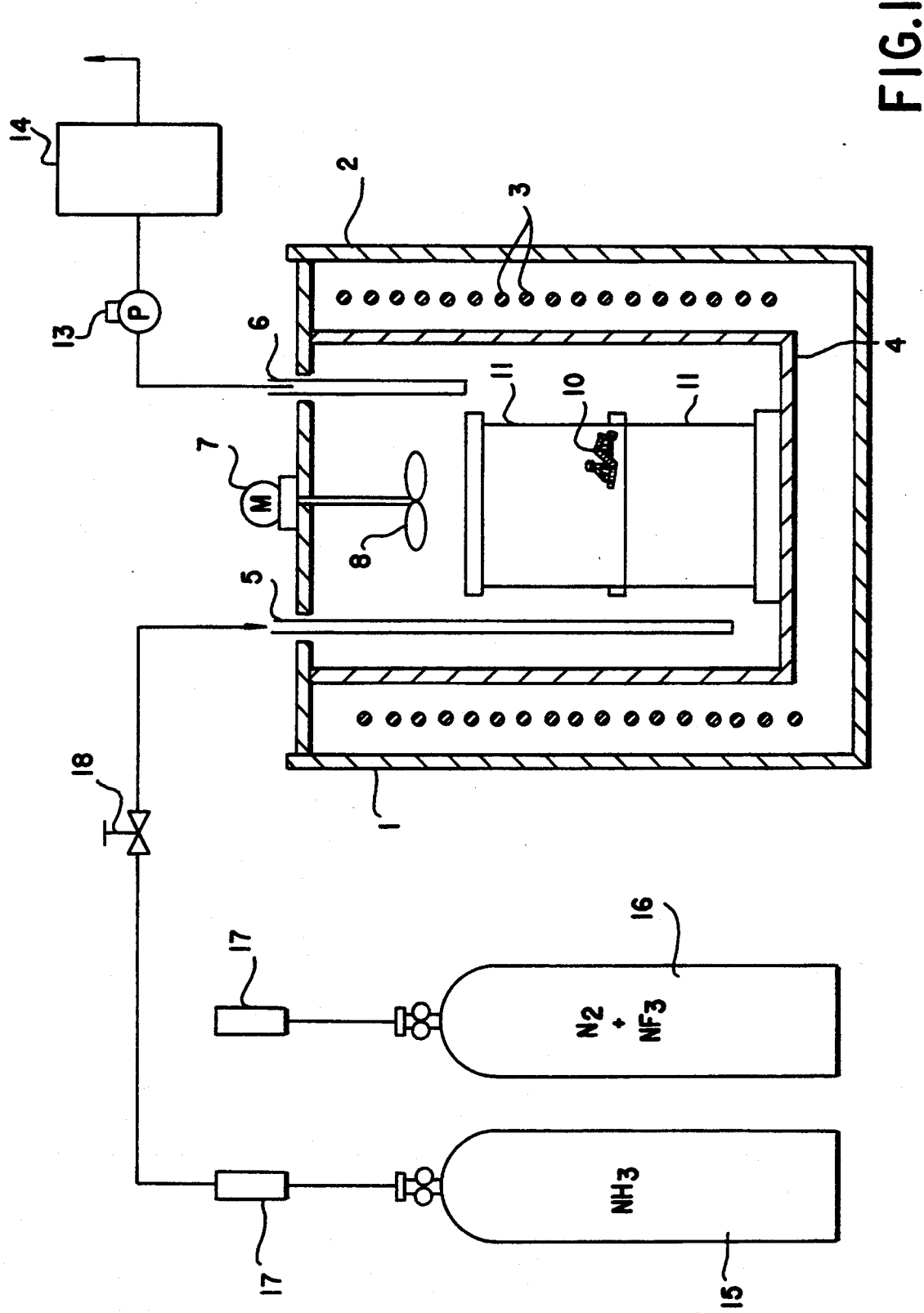
FIG. 1 shows a cross-sectional view of a treatment furnace.
Figure 2:
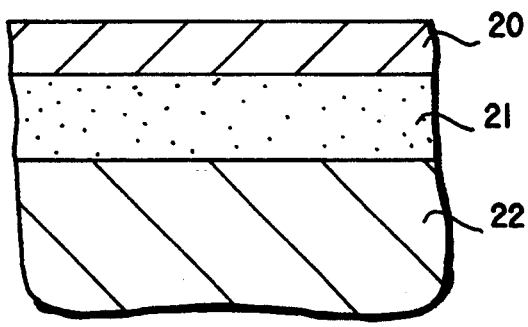
FIG. 2 shows a cross-sectional view illustrating a condition of a nitrided layer of a hard austenitic stainless steel screw.
Figure 3:
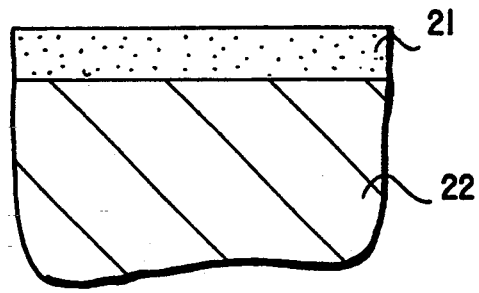
FIG. 3 shows a cross-sectional view illustrating a condition removed the ultra hard surface layer thereof.

A cross recessed head dry wall screw of SUS316 stainless steel works (4×25, cross recessed flat head screw) were cleaned with trichloroethylene, then charged into a treatment furnace 1 as shown in FIG. 1, and held at 300° C. for 15 minutes in an $N_2$ gas atmosphere containing 5,000 ppm of $NF_3$, then heated at 530° C., and nitriding treatment was carried out at that themperature for 3 hours while a mixed gas composed of 50% $NH_3$ plus 50% $N_2$ was introduced into the furnace. The works were then air-cooled and taken out of the furnace.

The nitrided layer of each work thus obtained was uniform in thickness. The surface hardness was 1,250–1,350 Hv while the base material portion had a hardness of 250–260 Hv.

Next, a part from the tiptop of said stainless steel work (dry wall screw head) to 10 mm depth was dipped in 15% $HNO_3$-5% HF solution (50° C.) for 20 minutes and taken out to remove the ultra hard surface layer in the nitrided layer.

Surface hardness of thus obtained stainless steel work were measured at the head part, in which the ultra hard surface layer is removed, and other parts separately. The results are described in Table 1.

TABLE 1

|  | Ultra hard surface layer (Screw thread part) | Removed part (Head part) |
| --- | --- | --- |
| Hardness of the surface (Hv) | 1280–1380 | 380–580 |

Figure 4:
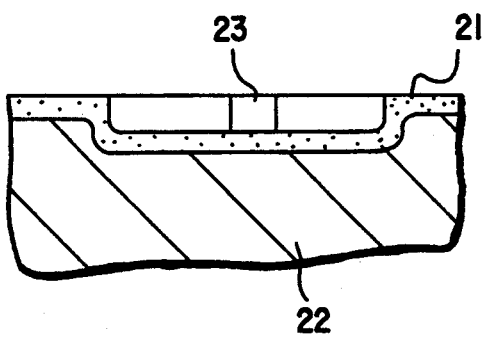
FIG. 4 shows a condition of a nitrided layer of a dry wall screw head part.
Figure 5:
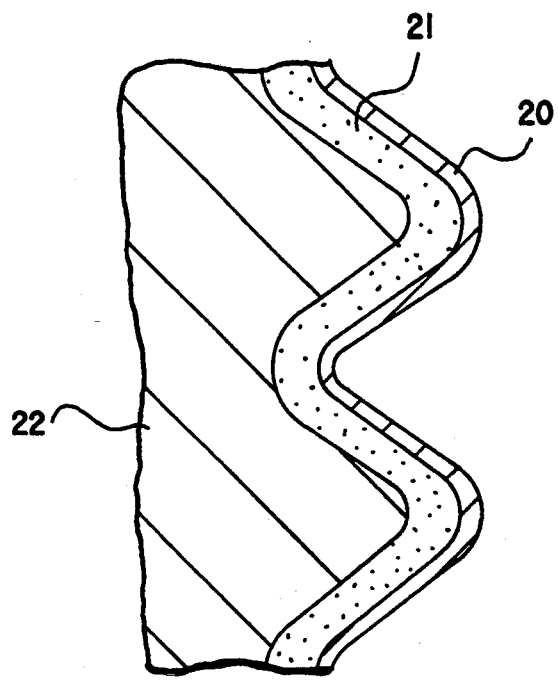
FIG. 5 shows a condition of a nitrided layer of a screw thread part.

Upon observing the cross section of said stainless steel work by photomicrograph, the screw thread part with the ultra hard surface layer remained comprises of the two nitrided layers, an ultra hard surface layer and an inner hard layer 21 beneath as shown in FIG. 5, while the head part removed its ultra hard surface layer consists of only one nitrided layer, the inner hard layer 21 as shown in FIG. 4. In FIG. 4, the reference numeral 23 is a cross recess.

Furthermore, corrosion accelerated test was conducted to thus obtained stainless steel work (dry wall screw). At first, a screw is cut at 5 mm below from the top of the screw head to divide it into a screw head and others, then neutral salt spray test was carried out separately. The results are shown in Table 2.

TABLE 2

| Head part surface | No change was seen after 500 hours |
| --- | --- |
| Thread part | Rust caused after 4 hours |

That is, the ultra hard surface layer removed screw head part did not cause rust and the like after conducting corrosion accelerated test for 500 hours, on the contrary the screw thread part caused rust after 4 hours.

In the stainless steel work (dry wall screw), surface hardness and strength of the head part is a little smaller than the thread part, but since surface hardness and strength of the thread part is maintained in a large state, it has self-tapping and drill-tightening properties which are not given by an ordinary stainless steel screw against a light gage steel.

EXAMPLE 2

A plurality of austenitic stainless steel hexagon head self-drilling screws 4×20 mm (XM7) and SUS 316 plate material (25×35×1 mm$^t$) were prepared, cleaned with acetone, charged in the furnace shown in FIG. 1, held in an $N_2$ atmosphere containing 5,000 ppm of $NF_2$ at 340° C. for 15 minutes, then raised the temperature at 530° C., to hold in $N_2$+90% $H_2$ for 30 minutes, nitrided at that temperature in a 20% $NF_3$+80% RX atmosphere for 5 hours, and taken out of the furnace.

As for a drilling screw, a portion from the tiptop of the screw head to 10 mm below therefrom and as for plate material, whole part was dipped in aqua regia diluted four times (at the temperature of 45° C.) for 20 minutes and taken out to wash. The whole part of the drilling screw was then plated with Ni-Zn for the purpose of smoothness. Screwing property was determined on the basis of JIS screwing test.

The screwing test of the drilling screw was conducted to 20 samples by screwing it into a steel (SPCC) plate with a thickness of 2.3 mm. Consequently, average screwing time was 2.12 seconds. The times was almost the same as that of what was not dipped from the top of the head part to 10 mm beneath in a $HNO_3$-HF solution.

Figure 6:
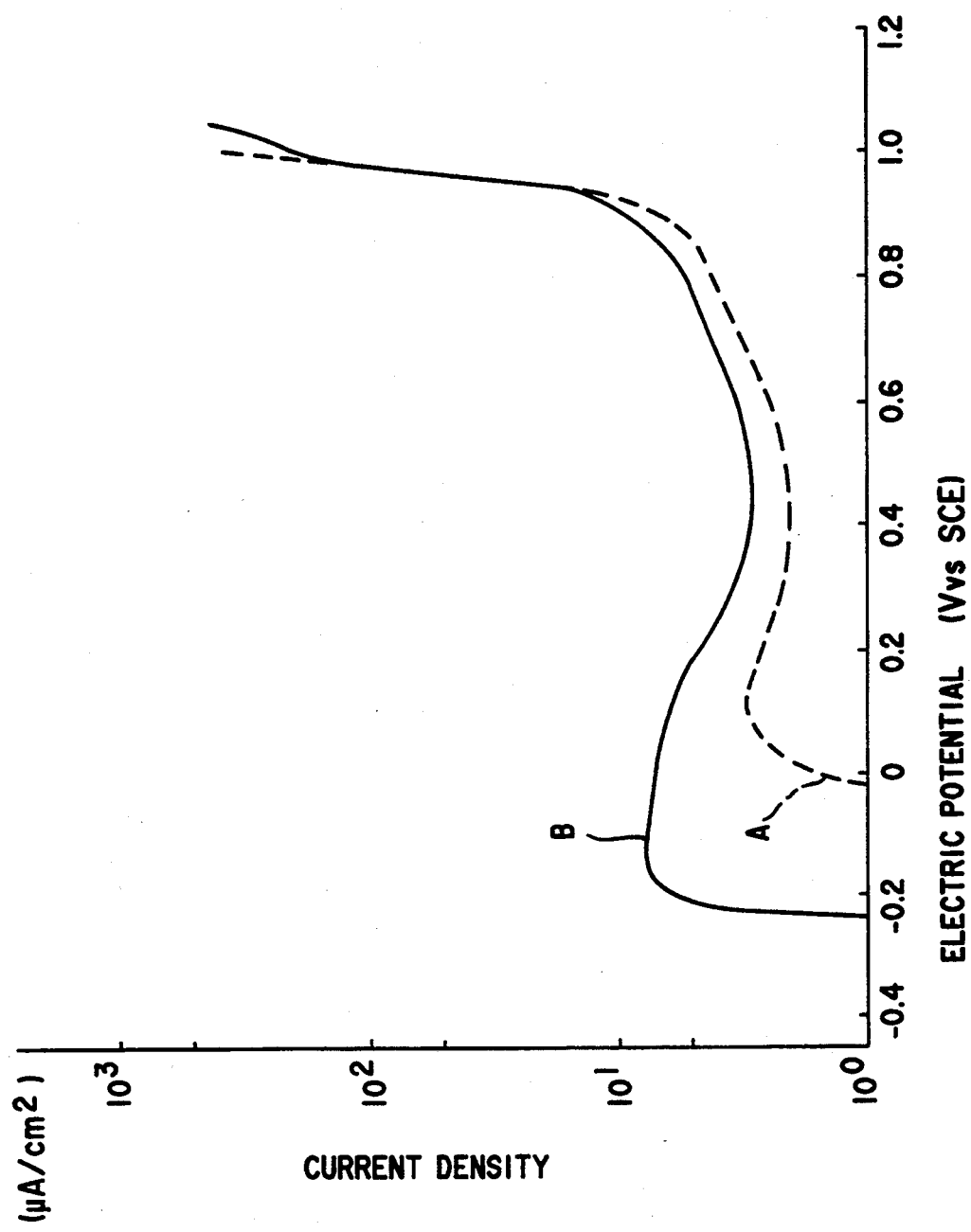
FIG. 6 shows an anode polarization curve diagram.

As for the plate material, anode polarization data in 5% $H_2SO_4$ solution was taken. The results were shown in FIG. 6. As shown by a curve A, a part of which the ultra hard surface layer was removed by soaking in acid shows almost similar corrosion resistance to a base material surface indicated by a curve B.

EXAMPLE 3

Austenitic stainless steel tapping screw (4×12 mm) and small screws (4×13 mm) were charged into a furnace shown in FIG. 1 and held at 200° C. in an atmosphere containing 1% $F_2$ for 40 minutes, then heated to 550° C. and nitrided at that temperature in 30% $NH_3$+10% $CO_2$+60% RX gas atmosphere for five hours. Other treatments were done as well as in Example 2. As a result of conducting weatherability test by CASS test method against those screws, there was no rust caused even after 700 hours, while in cemented iron articles (Ni-Zn plating) and 13 Cr stainless steel articles, white and red rust generated within 24 hours respectively.

EFFECTS OF THE INVENTION

As mentioned above, in the austenitic stainless steel screw according to the present invention, an ultra hard surface layer of a screw head part is removed from its nitrided layer to expose an inner hard layer because the ultra hard surface layer comprising intermetal compound such as CrN, $Cr_2N$ and $Fe_{2-3}$ easily causes rust. The inner hard layer comprises solid solution layer in which N, C and the like are solid soluble with the stainless steel base material not to hardly cause rust and has considerably high surface hardness and strength. Therefore, in the austenitic stainless steel screw the head part does not cause rust against acid rain and the like. The thread part thereof is not removed its ultra hard surface layer, so that the surface hardness and strength are almost the same as those of carbon steel products to allow the screw to have self-tapping and self-tightening properties. In the austenitic stainless steel screw, since base material itself has high corrosion resistance and the inner hard layer is rust preventive, even if rust generates on the ultra hard surface layer in the nitrided layer, it will neither extend to whole part nor influence the strength.

In the invention, since the austenitic stainless steel works as mentioned above are held in an atmosphere containing fluorine- or fluoride-containing gas to form a fluorinated layer on the surface prior to nitriding them, and nitrided in that state, a nitrided layer is formed uniformly and deeply to give a hard austenitic stainless steel screw having good surface properties.

What we claim is:

1. A stainless steel screw having a corrosion-resistant portion, the screw comprising:
   a core of austenitic stainless steel,
   a hard layer over the entire surface of the austenitic stainless steel core, the hard layer having a thickness of 30–150 μm and a hardness of 320–650 Hv and comprising a solid solution of N, Fe-C and austenitic stainless steel, and
   an ultra hard layer over a portion of the hard layer so as to leave a neck portion or a head portion of the screw of the hard layer forming an external surface of the screw, the ultra hard layer having a thickness of 15–30 μm and a hardness of 1200–1400 Hv and comprising intermetal compounds including an intermetal compound selected from the group consisting of CrN, $Cr_2N$, and $F_{2-3}N$;
   the ultra hard layer and the neck portion or head portion of the hard layer together forming the external surface of the screw.

2. A stainless steel screw having a corrosion-resistant portion, the screw comprising:
   a core of austenitic stainless steel,
   a hard layer over the entire surface of the austenitic stainless steel core, the hard layer having a thickness of 30–150 μm and a hardness of 320–650 Hv and comprising a solid solution of C, N, Fe-C and austenitic stainless steel; and
   an ultra hard layer over a portion of the hard layer so as to leave a neck portion or a head portion of the screw of the hard layer forming an external surface of the screw, the ultra hard layer having a thickness of 15–30 μm and a hardness of 1200–1400 Hv and comprising intermetal compounds including an intermetal compound selected from the group consisting of CrN, $Cr_2N$, and $F_{2-3}N$;
   the ultra hard layer and the exposed neck portion or head portion of the hard layer together forming the external surface of the screw.

3. An austenitic stainless steel screw including a corrosion-resistant neck portion or a head portion made by the process of heating an austenitic stainless steel screw in a fluorine-containing atmosphere at a temperature sufficient to form a fluoride layer on the surface of the austenitic stainless steel screw;
   heating the austenitic stainless steel screw coated with the fluoride layer in a nitriding atmosphere at a temperature sufficient to transform the fluoride layer to a nitride layer having a thickness of 45–180 μm; and
   removing 15–30 μm of the surface of the nitride layer of a neck portion of a hard portion of the nitrided austenitic stainless steel screw to be made corrosion-resistant.

4. An austenitic stainless steel screw including a corrosion-resistant neck portion or a head portion made by the process of heating an austenitic stainless steel screw in a fluorine-containing atmosphere at a temperature sufficient to form a fluoride layer on the surface of the austenitic stainless steel screw;
   heating the austenitic stainless steel screw coated with the fluoride layer in a nitriding atmosphere at a temperature sufficient to transform the fluoride layer to a carbonitride layer having a thickness of 45–180 μm; and
   removing 15–30 μm of the surface of the nitride layer of a neck portion or a head portion of the nitrided austenitic stainless screw to be made corrosion-resistant.

* * * * *